(12) United States Patent
Ullmann et al.

(10) Patent No.: US 7,080,359 B2
(45) Date of Patent: Jul. 18, 2006

(54) STACK UNIQUE SIGNATURES FOR PROGRAM PROCEDURES AND METHODS

(75) Inventors: Lorin Ullmann, Austin, TX (US); Allen Chester Wynn, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 10/047,011

(22) Filed: Jan. 16, 2002

(65) Prior Publication Data
US 2003/0154464 A1    Aug. 14, 2003

(51) Int. Cl.
G06F 9/44           (2006.01)

(52) U.S. Cl. ............... 717/128; 717/127; 717/124; 717/140

(58) Field of Classification Search ........ 717/127–133, 717/140, 124, 158
See application file for complete search history.

(56) References Cited

U.S. PATENT DOCUMENTS

| 5,191,534 | A | * | 3/1993 | Orr et al. ................... 700/105 |
| 5,579,520 | A |   | 11/1996 | Bennett ....................... 395/704 |
| 5,606,661 | A | * | 2/1997 | Wear et al. ................... 714/38 |
| 5,628,016 | A | * | 5/1997 | Kukol .......................... 717/140 |
| 5,774,729 | A | * | 6/1998 | Carney et al. ............... 717/126 |
| 5,926,631 | A |   | 7/1999 | McGarvey ................... 395/500 |
| 5,950,003 | A | * | 9/1999 | Kaneshiro et al. ........... 717/130 |
| 6,002,872 | A | * | 12/1999 | Alexander et al. .......... 717/127 |
| 6,014,515 | A | * | 1/2000 | Burch ........................ 717/129 |
| 6,110,226 | A |   | 8/2000 | Bothner ......................... 717/7 |
| 6,119,206 | A | * | 9/2000 | Tatkar et al. ............... 711/147 |
| 6,131,187 | A |   | 10/2000 | Chow et al. .................... 717/5 |
| 6,161,219 | A | * | 12/2000 | Ramkumar et al. .......... 717/130 |
| 6,289,446 | B1 | * | 9/2001 | Nilsson ....................... 712/244 |
| 6,293,712 | B1 | * | 9/2001 | Coutant ....................... 717/155 |
| 6,314,558 | B1 | * | 11/2001 | Angel et al. ................. 717/118 |
| 6,519,767 | B1 | * | 2/2003 | Carter et al. ................ 717/140 |
| 6,662,358 | B1 | * | 12/2003 | Berry et al. ................. 717/128 |
| 6,807,583 | B1 | * | 10/2004 | Hrischuk et al. ........... 719/318 |
| 6,862,696 | B1 | * | 3/2005 | Voas et al. .................... 714/38 |

FOREIGN PATENT DOCUMENTS

| CA | 2241865   | 6/1998 |
| WO | WO9949392 | 11/1996 |

OTHER PUBLICATIONS

INSPEC (Diaz, JAP, et al), 3 articles.

* cited by examiner

*Primary Examiner*—Kakali Chaki
*Assistant Examiner*—Jason Mitchell
(74) *Attorney, Agent, or Firm*—Robert H. Frantz; Mark S. Walker

(57) ABSTRACT

A system and method for inserting stack signature marking segments into application program modules at the entry and exit points of the application program segments prior to compilations. Unique module identifier values are assigned to each application program module. During execution of the modified application software modules, upon entry into a new module or instance of a module, the unique module identifier is pushed onto the stack along with an instance number and an entry indicator. Upon termination of the module or instance of a module, the unique module identifier is pushed onto the stack with the instance number and an exit indicator, thereby placing an entry signature and an exit signature onto the stack bracketing the stack frame assigned to that module or module instance. During debug of exceptions, these signatures may be used to locate and identify stack frames and their associated software modules.

18 Claims, 6 Drawing Sheets

STACK UNIQUE SIGNATURES FOR PROGRAM PROCEDURES AND METHODS

CROSS-REFERENCE TO RELATED APPLICATIONS (CLAIMING BENEFIT UNDER 35 U.S.C. 120)

This patent application is related to U.S. patent application Ser. No. 09/497,606, filed on Feb. 3, 2000, by Allen C. Wynn. Mr. Wynn is a co-inventor for the present patent application, and both applications are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 09/497,606, filed on Feb. 3, 2000, by Allen C. Wynn, is hereby incorporated by reference in its entirety, including figures.

BACKGROUND OF THE INVENTION

1. Field of the Invention

This invention relates to technologies and methods for debugging runtime exceptions when developing or testing software, and especially to debugging and diagnosing failures related to Java and embedded Java Virtual Machines.

2. Description of the Related Art

The Java programming language and Java Virtual Machine (JVM) execution environment are well known in the art. Many programmers and designers are skilled at developing application programs in Java to be run under a JVM.

An "exception", according to the Java Virtual Machine Specification, is defined as an event which occurs when a Java program violates the semantic constraints of the Java language. For example, a program may attempt to index outside the bounds of a data array. In general, an exception may be "thrown" for one of three reasons:

(1) an abnormal execution condition is synchronously detected by a Java Virtual Machine;

(2) an operation is performed that violates the normal semantics of the Java language, such as indexing outside the bounds of an array; or (3) an error occurs when loading or linking part of a Java program.

When an exception is thrown, the JVM performs a non-local transfer of control from the point where the exception occurred to an exception handling point, which is specified by the designer of the violating program. Therefore, in Java parlance, the exception is "thrown" from the point were the error occurs, and "caught" at the point to which control is transferred. If the exception is caught at a point outside the violating method, it is referred to as having completed abruptly.

Using "throw statements", Java programs may also throw exceptions explicitly, which provides an alternative to the traditional method of returning error values, such as the integer value "−1".

In order to throw an exception, a JVM abruptly completes, one-by-one, all expressions, statements, method and constructor invocations, static initializers, and field initialization expressions that are running in the current thread until a handler is found that indicates that it handles the thrown exception (e.g. by naming the class of the exception or a superclass of the class of the exception). If no exception handler is found, a default method, "uncaught-Exception", is invoked for the thread group that is the parent of the current thread.

The Java class "RuntimeException" is a subclass of class "Exception", subclasses of which are unchecked exception classes. The unchecked runtime exceptions defined by package "java.lang" are given in Table 1.

TABLE 1

Java Runtime Exceptions

| Exception Name | Example or Description |
| --- | --- |
| ArithmeticException | an integer division or remainder operation with a zero divisor |
| ArrayStoreException | storing a value whose class is not assignment compatible with the component type of the array |
| ClassCastException | casting a reference to an object to an inappropriate type |
| IllegalMonitorStateException | waiting on an object that it has not been locked |
| IndexOutOfBoundsException | an index or a subrange specified out of range |
| NegativeArraySizeException | creating an array with a negative length |
| NullPointerException | using a null reference in a case where an object reference is required |
| SecurityException | security violation |

While debugging Java runtime exceptions (e.g. NULL pointer), it is difficult to locate the origin of the exceptions because the call chain is generated from the nearest method which catches the exception. Many of the methods which were executed in between are skipped by the dump stack methods, which obfuscates the call-path and the method which caused the exception.

When using embedded Java Virtual Machines (JVM), the ability of an engineer or software tester to be able to find the originator of an uncaught exception is especially important as the exception can possibly bring the entire JVM down.

Therefore there is a need in the art for a system and method which aids a software designer in determining the originator of an uncaught exception so that the program error may be diagnosed and corrected. Further, there is a need in the art for this new system and method to be readily useful for popular programming languages and environments such as Java and JVM's.

BRIEF DESCRIPTION OF THE DRAWINGS

The following detailed description when taken in conjunction with the figures presented herein provide a complete disclosure of the invention.

SUMMARY OF THE INVENTION

The present invention provides a system and method for inserting stack signature marking segments into application program modules at the entry and exit points of the application program segments prior to compilations. Unique module identifier values are assigned to each application program module. During execution of the modified application software modules, upon entry into a new module or instance of a module, the unique module identifier is pushed onto the stack along with an instance number and an entry indicator. Upon termination of the module or instance of a module, the unique module identifier is pushed onto the stack with the instance number and an exit indicator, thereby placing an entry signature and an exit signature onto the stack bracketing the stack frame assigned to that module or module instance. During debug of exceptions, these signatures may be used to locate and identify stack frames and their associated software modules.

DETAILED DESCRIPTION OF THE INVENTION

The preferred embodiment of the present invention is to realize a stack signature generation method as a switch to a software compiler, and related software to automatically insert stack signature marking software into application programs at the time the application programs are being compiled.

Compilers often have many switches available to the user for various code execution, memory usage and compactness options, and security and privilege options. In an alternate embodiment of the present invention, the compile option may be implemented as a "#pragma" compiler directive, which allows the software designer to designate specific procedures, modules, or areas of code for which he wishes the stack signature marking code to be injected.

For better understanding of the present invention, we first review the general operation of computer stacks and the calling and returning processes. A computer program process may "call" another process or subroutine to be executed on the same or by the same processor which is executing the "calling" process. When the "call" operation or instruction is executed, the execution of the "calling" process is halted at the point of the "call" instruction, and the "called" process or subroutine is initialized and executed.

In order to allow the "called" process or subroutine to fully utilize all or part of the processor's computing resources, including the processor's registers, and in order to preserve the context of the "calling" process, a program stack is used. A stack in a computer system is a data structure disposed in a computer-readable memory which dynamically stores variable and processor state information between process calls and returns.

Figure 1:
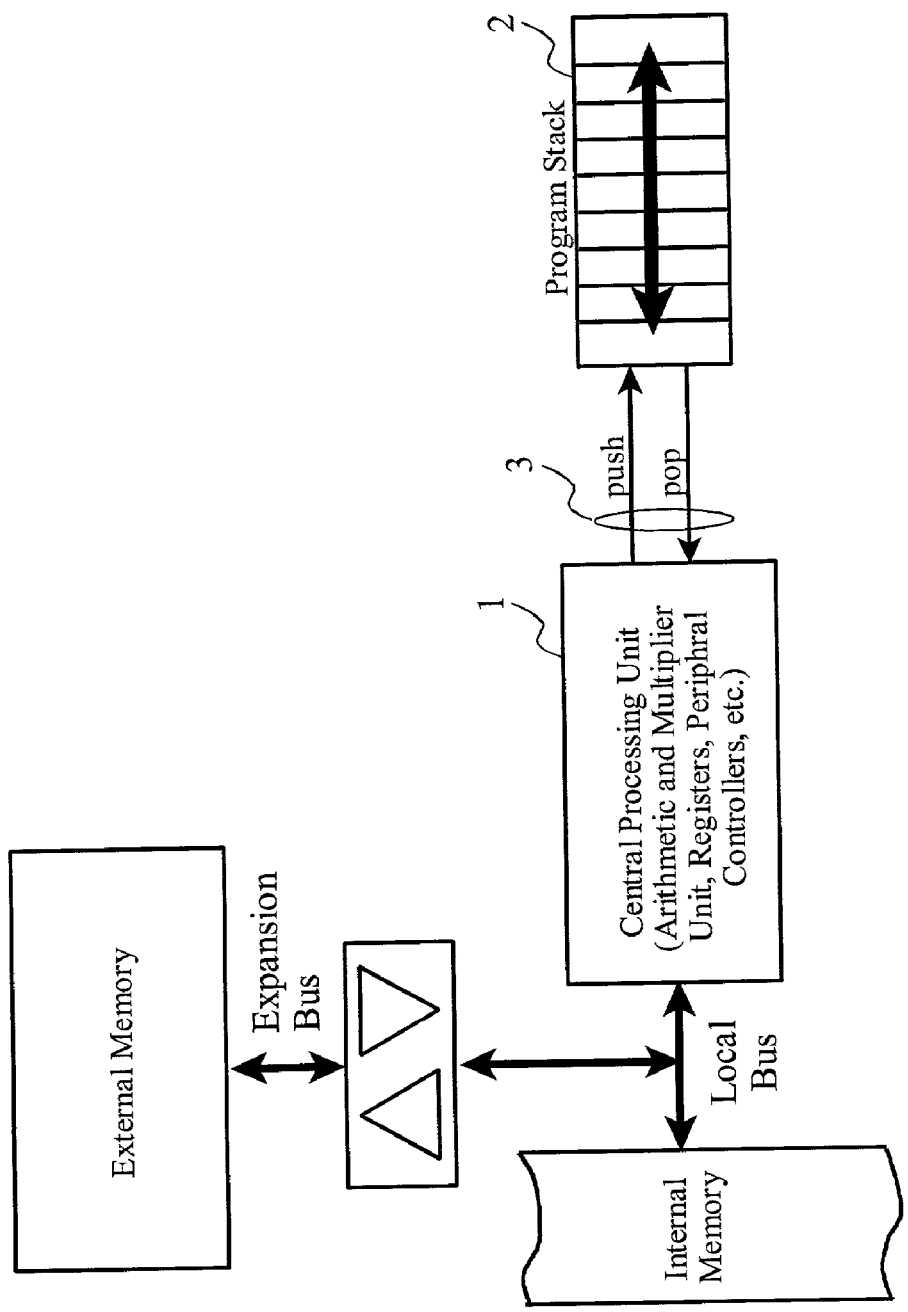
FIG. 1 shows the prior art relationship of central processing units and stack memory.

The stack has a "first-in-last-out" ("FILO") structure. As data is placed into it, or "pushed onto the stack", older data is pushed further into the structure. As shown in FIG. 1, a processor (1) has a bi-directional data bus (3) to the stack memory (2). Often, the stack memory and bi-directional data bus is integrated into the processor microchip itself.

At the assembly language level, most processors have a "push" operation which will copy data from a processor register or memory location to the top of the stack, and will adjust the top-of-stack pointer appropriately. Conversely, a "pop" operation will copy data from the top of the stack into a processor register or memory location, and will adjust the top-of-stack pointer. Some processors implement the stack in an incrementing address fashion, such that "pushes" result in increases in the stack pointer value, and "pops" result in decreases in the stack pointer value. Other processors may take the opposite approach, but achieve identical functionality, including adding data to the bottom of the stack rather than the top of stack. These variations of conventions for stack handling and construction are well understood in the art.

When the processor executes a "call" operation, an automatic "push" of the contents of the program counter register is made, thereby storing the return address of the calling process on the stack. When the called operation or subroutine executes a "return" operation, an automatic "pop" of the top of the stack contents is made to the program counter, which restores the program counter to the return address of the calling process or routine.

When a function call is made from a high-level language ("HLL"), such as "C" or Java, the compiler generates assembly language representing the higher-level statements in the HLL to implement the source code into assembly code. When a function or routine call includes arguments to be passed to and returned from the function or routine, the compiler injects not only the assembly "call" opcode into the assembly language, but also a block of code to store the argument values on the stack, as well. This block or sequence of assembly language instructions may include several "pushes", or special write or store operations, to the stack. Also, in typical HLL compilers, the processor context may be stored on the stack as part of the function or subroutine call operation. The context of the processor typically includes volatile processor register values, such as interrupt control registers, indirect addressing registers and other control registers. A processor-specific example of a volatile register which is stored as part of the context save is the ECX register of an Intel x86 processor.

When a subroutine is initialized as the result of a "call" operation, it typically sets up a local stack frame for data variables which are local to the subroutine. These local variables are usually addressed by an offset from the beginning of the local stack frame, commonly stored in a "base" register, such as BP or EBP on an Intel x86 processor. In addition, sometimes temporary or transient values are stored on the stack dynamically within the subroutine, rather than including them as part of the local stack frame.

Figure 2:
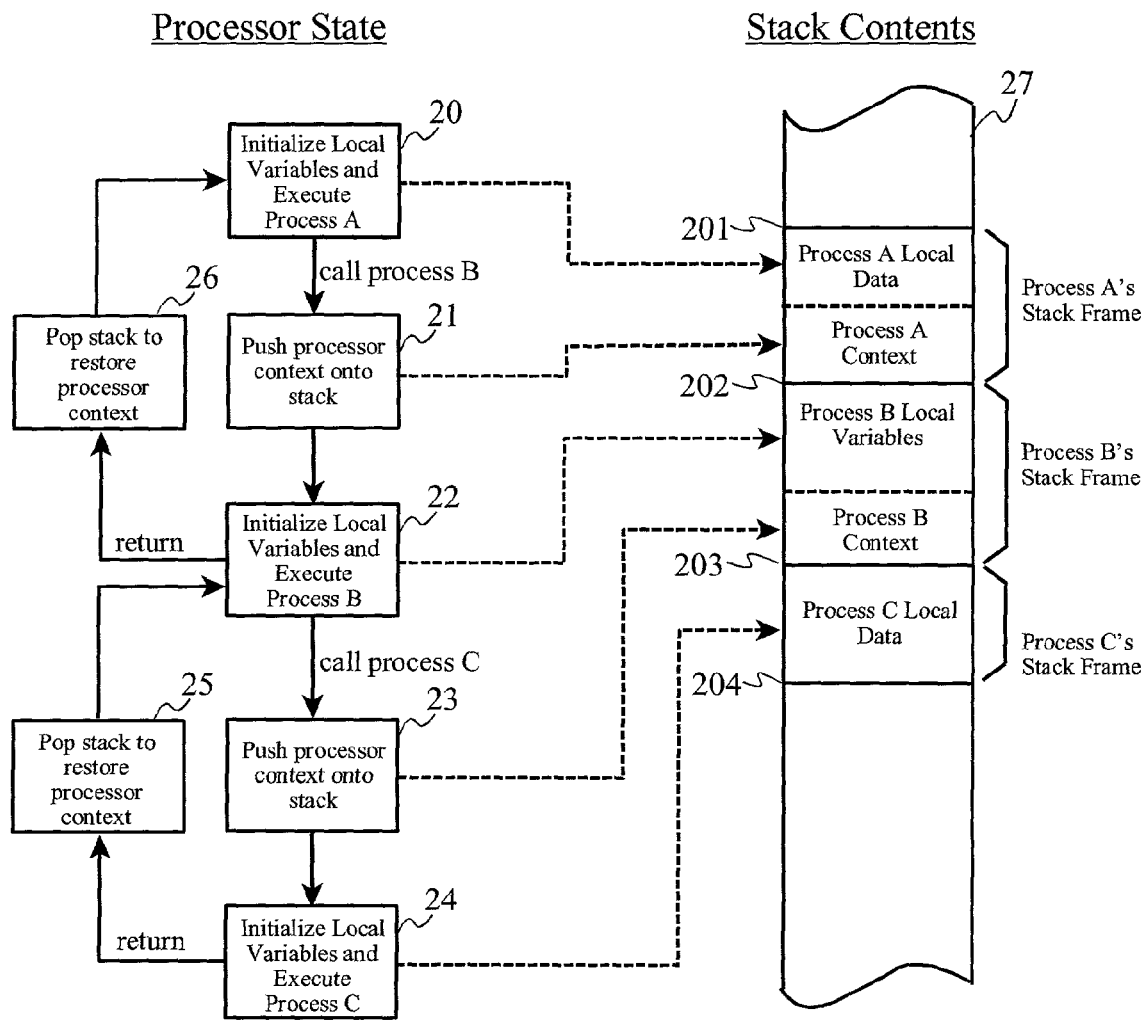
FIG. 2 illustrates the typical process of stack management related to program "call" and "return" operations.

As shown in FIG. 2, if executing Process A (20) calls Process B, the return address and context of the processor for Process A is pushed (21) onto the stack, and the pointer for the top of the stack is moved to the "top" of the memory containing the Process A context data (202). Further, space is created on the "top" of the stack for Process B's local variables. Execution of Process B then takes place (22), until Process B calls Process C. At this time, the processor pushes the processor context onto the stack for Process B's current state (23), and moves the top of stack pointer appropriately (203) to make room for Process C's local variables.

When Process C completes its execution, it will typically execute a "return" operation, which causes the processor to move the top of stack pointer down to Process B's area (202), and to "pop" or read the processor register values from the stack area for Process B (25). The register values are restored to B's state, and the software for Process B is resumed execution (22) from the point of the "call" operation in Process B's instruction code. When Process B completes its execution, a similar "return" operation is made, the top of stack pointer is moved downward (202), and the context for Process A is restored so that Process A's execution (20) can resume and the point of the "call" instruction in Process A's code. This type of general stack operation is well known within the art.

It well known within the art that the stack can be implemented in computer memory in linear, contiguous memory space, or it may be implemented as a distributed linked list of sections of memory space, while still providing the same functionality as described supra. Additionally, some computer systems "push" data onto the stack in incrementing address values (which results in "pops" decreasing the address values), while other systems "push" data onto the stack in decrementing address values (and "pops" increase the address value). Further, systems which run operating systems may contain the stack management functionality in operating system modules in order to free the application software from stack management, which in simpler systems, stack management may be handled directly by the application software modules. These variations of the pointer management do not affect the FILO operation of the stack, and are merely alternate implementations of the same structure.

Figure 3:
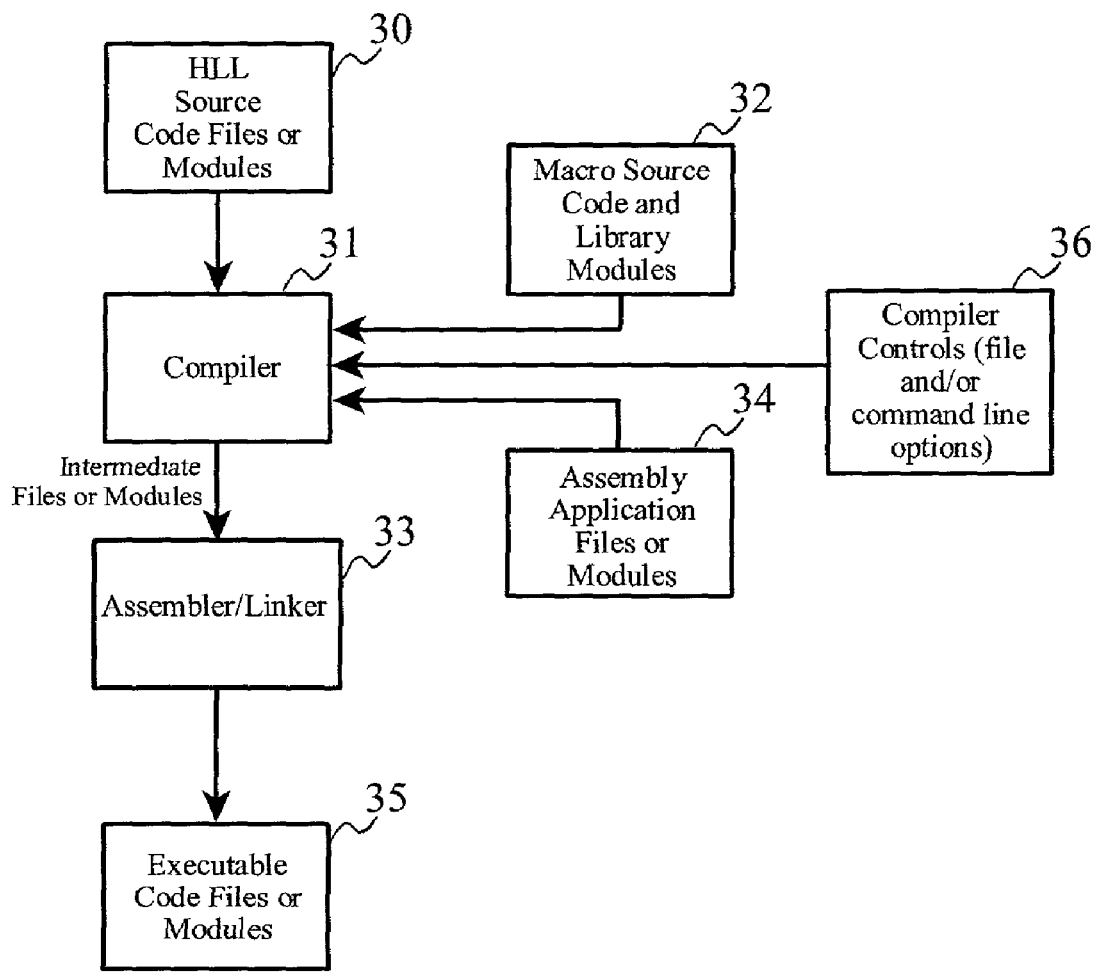
FIG. 3 shows the general process of compiling, assembling, linking and otherwise producing executable code from source code.

Turning to FIG. 3, the fundamental and well-known compiler and assembler process is shown. High-level source code (30), such as "C" or Java code, is compiled (31) by initially performing syntactical analysis, converting the source code to a standardized or tokenized format, processing any compiler directives, expanding any macros (32), including assembly and other library routines (34) as indicated by the code, and generating an intermediate representation of the code, such as an object file. The compiling process is controlled by various compiler controls (36), such as a "make file" for compiling "C" code and command-line options to the compiling invocation. In the final phase, the various modules of code which are in intermediate form are "assembled" and "linked" (33) to create a run-time image of executable binary code (35) for a specific processor. This general process is followed by most compilers for most languages, and is well understood in the art.

In the preferred embodiment, a standard compiler is modified to include the inventive method to insert the stack signature marking code during the early phases of processing the HLL source into intermediate or assembly language form. This approach has several advantages.

First, as all HLL is processed through this state, it allows the invention to be utilized on a wider array of source languages. Second, as assembly code is much more efficient than compiled HLL, the system performance impact of the code insertions is minimized by including the cleaning code as assembly code instead of HLL code or an HLL macro.

Figure 4:
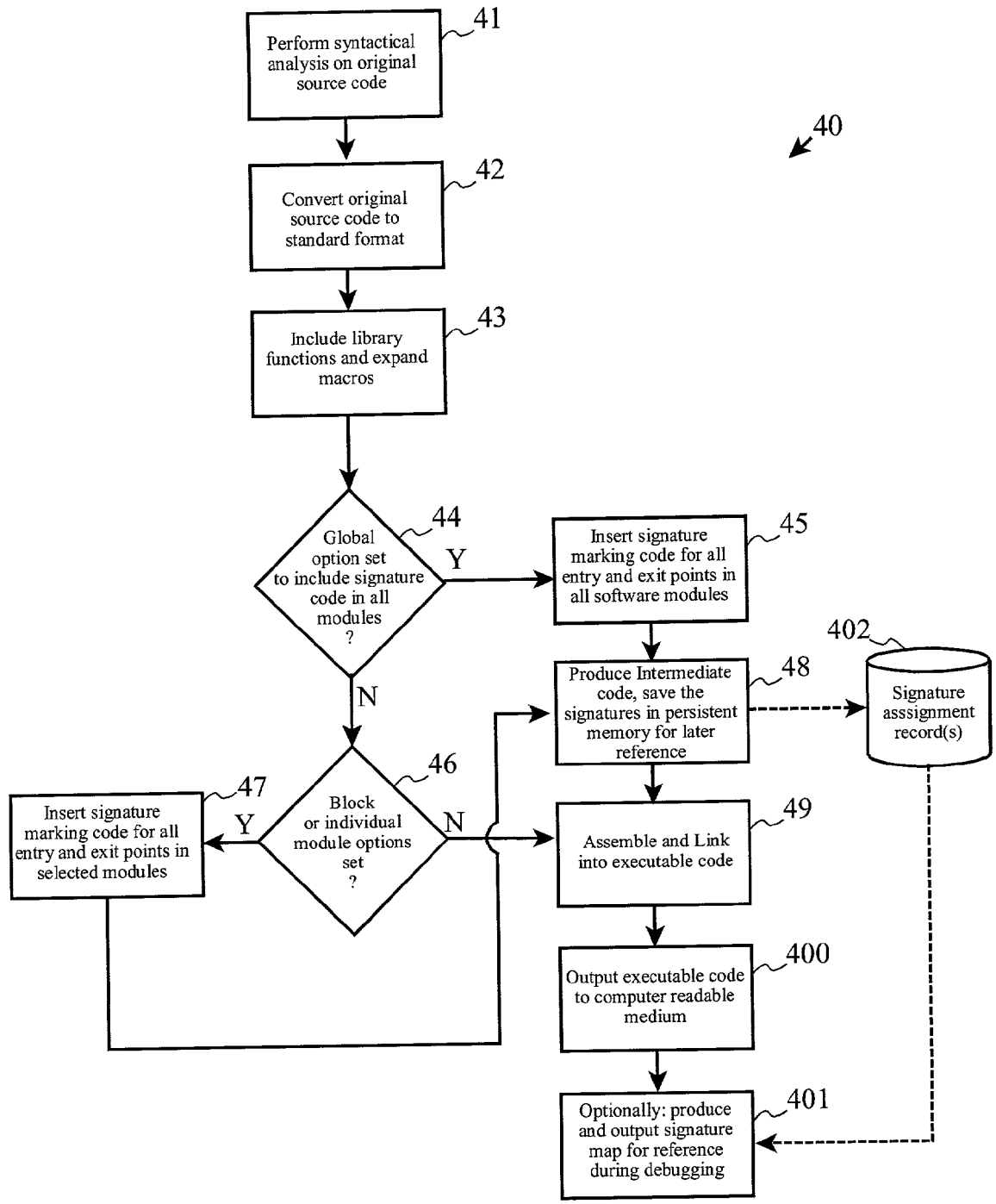
FIG. 4 discloses the logical process of the modified compilation process to include the insertion of the stack signature marking code in selected application programs during compilation.

However, in systems where runtime performance is not a primary concern, the stack signature marking code can be implemented as macro insertions in HLL. Therefore, the preferred embodiment process of compiling (40) has the following steps, and as shown in FIG. 4:

(a) perform (41) syntactical analysis on original source code;

(b) convert (42) the original source code to standard format;

(c) include library functions and expand macros as indicated by the source code (43);

(d) if global stack signature marking switch is selected (44), then perform the following steps for all code (45), otherwise (46), perform the following steps for code surrounded by a enable-disable pair of compiler directives (47):

(1) scan code for entry points and "return" operations;

(2) for each entry point and "return" operation, insert code for placing a signature value on the stack, using an entry indicator for the entry points and an exit indicator for the exit points;

(e) produce (48) intermediate code, including storing the assigned signature values to persistent memory (402) such as in a computer file;

(f) assemble and link (49) the intermediate code into executable code;

(g) output (400) the executable code to a computer-readable medium; and (h) optionally, generate (401) a map or listing of signature values assigned to each entry and exit (return) point in the code for use by a software designer during debug.

For step (d), the preferred embodiment includes four types of compiler controls: a global control, a per-procedure control, an enable-disable pair, and a command line option. If a global control, such as:

pragma stack_signature_mark_all is included in the compiler control file, all software will be processed and modified to include the stack signature marking method where applicable.

If a per-procedure control, such as:

pragma stack_signture$_{13}$ mark_next_procedure is included in the compiler control file, only the code of the following procedure will be processed and modified to include the stack signature marking method where applicable.

If a compiler directive enable-disable control pair, such as:

```
#pragma stack_signature_marking_on
...                           /* executable source code
#pragma stack_signature_marking_off
``` is included in the source code, then only code located between the control pair will be processed and modified to include the stack signature marking method where applicable.

Alternatively, the global control can be set to enable the insertion of the stack signature marking code by a command line parameter upon invocation of the compiler, such as:

make control_file_name -signature_mark_stack_all

Figure 5:
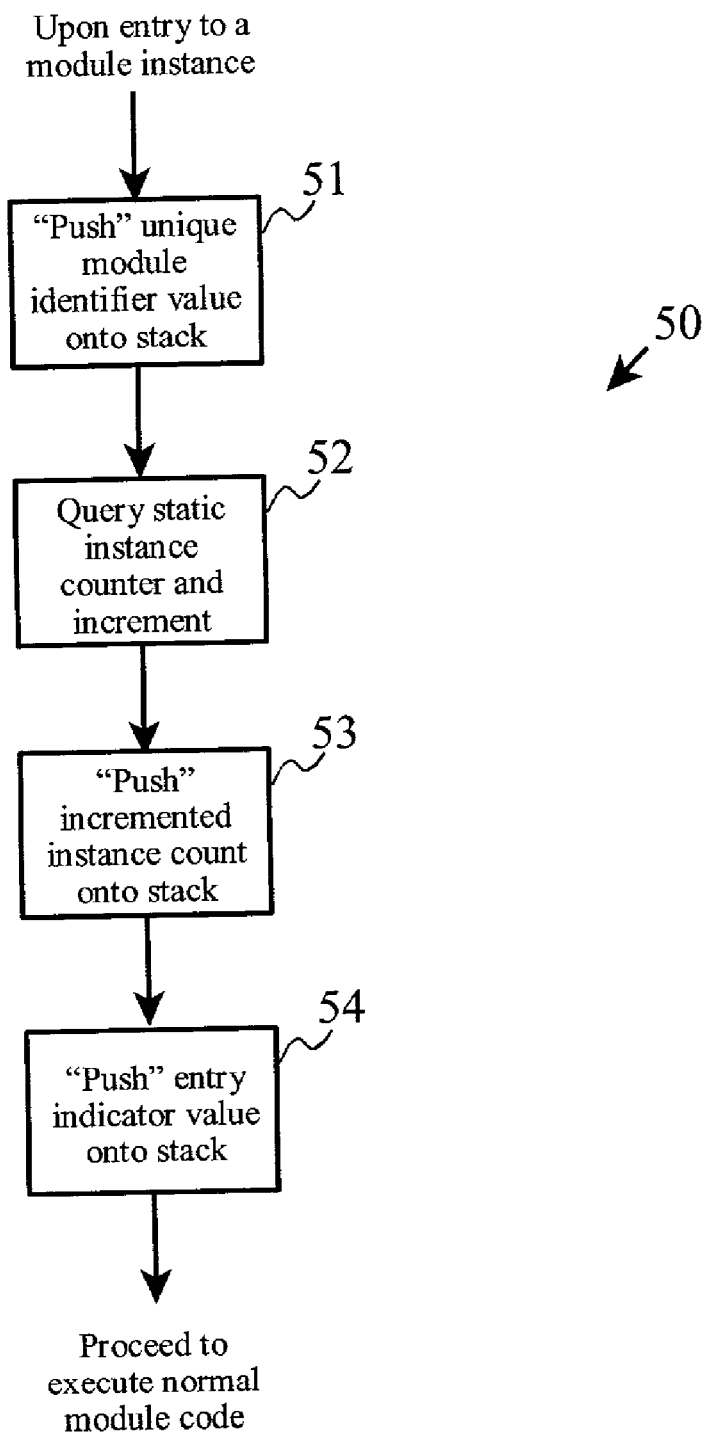
FIG. 5 sets forth the logical process of the signature marking code which is inserted into selected application programs near their entry points.
Figure 6:
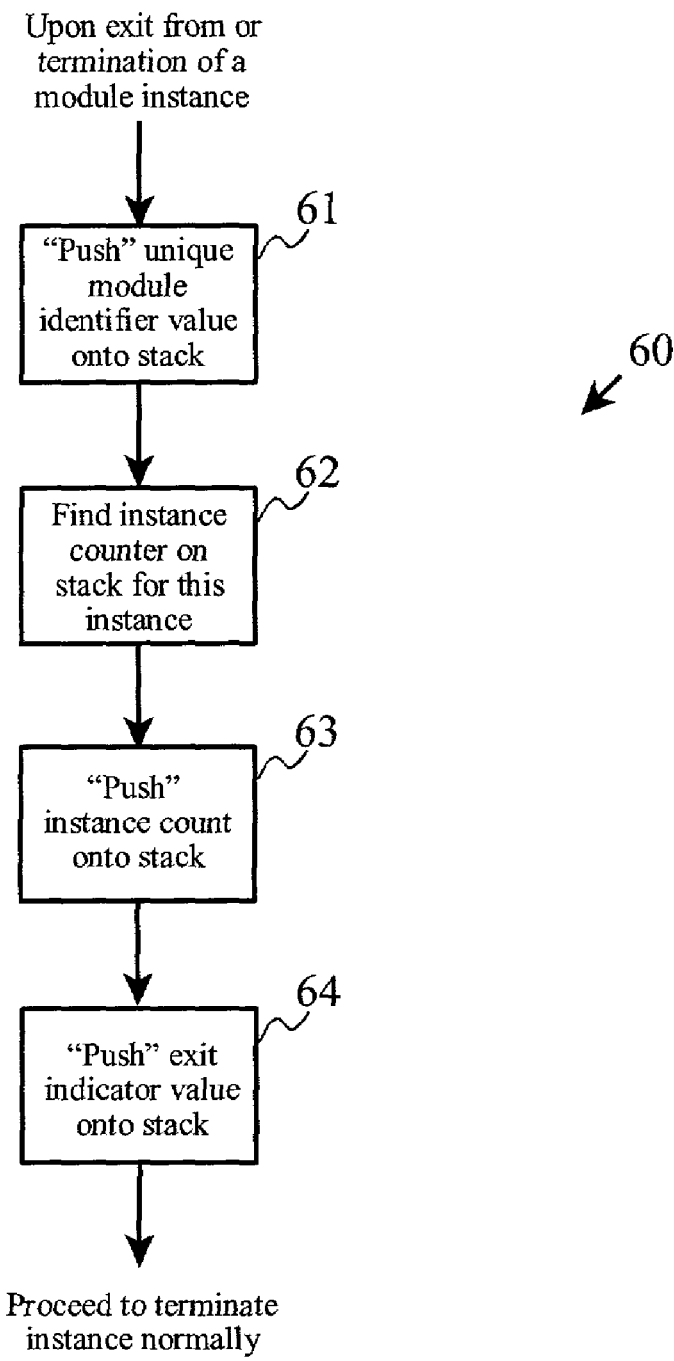
FIG. 6 sets forth the logical process of the signature marking code which is inserted into selected application programs near their exit points.

Turning to FIGS. 5 and 6, the methods of the signature marking code for entry and exit, respectively, which are inserted into application programs by the modified compiler are shown in preferred embodiments. The objective of the code to be inserted into each application program is to provide it with software which will place a "signature" or recognizable data pattern on the stack when it is run and when it terminates or "returns". Then, during debug, the stack can be examined for these signatures, and it can be determined which portions of the stack belonged to which processes. Once this is known, debug of the actual problem can proceed normally by inspecting the stack contents, states of the processes at the time of the exception, etc.

In a basic embodiment, the stack signature marking code portions which are inserted are assigned predetermined signature values during compilation by the modified compiler. Although the same code segments may be inserted in each application program, they may each be given a unique definition statement for their signature value.

However, in object oriented programming environments and for re-entrant code designs, a particular application module may be called or executed more than once simultaneously. Therefore, in order to effectively debug which copy or instance of an application program caused an exception, there is preferably a mechanism which allows the stack signature to be unique for each instance of an application program or method.

To provide this feature according to the preferred embodiment, static variables which are not garbage collected upon process termination are used in the stack signature marking code segments to provide some persistency or record as to which modules have run, which instance of a module is being instantiated, etc. For example, if a print module has been instantiated once, it could write to a static variable the unique identifier assigned to the print module during compile time followed by a number "1" for the first instance of that module. When a second instance of the print module is instantiated, it would query the static variable for the present instance number, add one to it (now "2"), and write that to the static variable for future use by future instances of the module. This module identifier and instance number would then be used as the "signature" for each instance on the stack. Further, a indicator for "entry" or "exit" may be recorded with the signature to provide more information regarding the history of the execution of each instance of each module. As such, each signature placed on the stack actually comprises a triplet of data values:

(a) a unique module identifier;

(b) an instance number; and (c) an entry/exit indicator.

In a more advanced realization of the invention, if the system has a real-time clock, a time stamp could also be provided with the signatures on the stack. Another variation of the realization of the invention could include the use of a randomly-generated number for the unique module identifier, which eliminates the need for the global static variable to keep count of each instance of a executable module. According to another aspect of an enhanced embodiment, the signature assignment records (402) may be encrypted with a key in order to allow debugging without allowing access to the source code, and the signature records can be stored on a networked drive so that those performing debugging may have access to signatures for modules which they did not develop themselves.

According to FIG. 5, the module entry signature code segment (50) inserted at the entry point of each application program module first pushes an assigned unique module identifier value onto the stack (51). Then, it checks the current value of the instance counter for that code module type (52), and increments the counter. This is the instance count for this particular instance of the module, which is pushed onto the stack following the identifier module (53). Finally, a data value indicating that this signature triplet is an entry signature for this module instance is pushed onto the stack (54), and the normal application code is then executed.

Turning to FIG. 6, the module exit signature code segment (60) which is inserted prior to an application program module exit statement (such as a "return" or "terminate" statement) is shown. First, the module's identifier value is pushed onto the stack (61). Then, the module's stack frame is searched to find the entry signature triplet, and the instance number is retrieved from the entry triplet and the instance value is pushed onto the stack (63). Finally, an exit indicator is pushed onto the stack, completing the exit signature triplet for this module instance, followed by allowing the normal module termination code to execute.

It will be understood from the foregoing description that various modifications and changes may be made in the preferred embodiment of the present invention without departing from its true spirit, such as the use of alternate programming methodologies or languages, alternate microprocessor architectures, and software development tool sets. It is intended that this description is for purposes of illustration only and should not be construed in a limiting sense. The scope of this invention should be limited only by the language of the following claims.

What is claimed is:

1. A method for marking a processing stack with signatures to indicate which portions of the stack were utilized by one or more re-entrant or object-oriented programming software code modules, said method comprising the steps of:

inserting stack signing software into one or more re-entrant or object-oriented programming code modules stored in a computer-readable medium;

producing one or more executable programs containing one or more executable re-entrant or object oriented programming code modules containing said inserted stack signing software;

upon execution of said executable re-entrant or object-oriented code modules, assigning unique module identifier values to said code modules by said stack signing software, said stack signing software preventing module identifiers from having a same value for multiple instances of any re-entered or multiply instantiated code module, and pushing onto said processing stack said stack signatures within stack frames allocated to said code modules.

2. The method as set forth in claim 1 further comprising the steps of:
generating an instance count for each instantiation of executable code module in said stack signature for each object instance dynamically created during runtime of a re-entrant executable code module; and
pushing onto said processing stack said instance count.

3. The method as set forth in claim 1 further comprising the step of pushing onto said stack an entry/exit indicator associated with said unique module identifier.

4. The method as set forth in claim 1 further comprising the step of inserting stack signature marking software segments into application source code, said insertion step being performed prior to compilation of said application source code.

5. The method as set forth in claim 4 further comprising the step of providing a global control which indicates all application source code modules are to have stack signature marking software segments inserted into them during a given compilation job.

6. The method as set forth in claim 4 further comprising the step of providing a selective control which indicates only certain application source code modules are to have stack signature marking software segments inserted into them during a given compilation job.

7. A computer readable medium encoded with software for marking a processing stack with signatures to indicate which portions of the stack were utilized by which application code modules, said software causing a processor to perform the steps of:
inserting stack signing software into one or more re-entrant or object-oriented programming code modules stored in a computer-readable medium;
producing one or more executable programs containing one or more executable re-entrant or object oriented programming code modules containing said inserted stack signing software;
upon execution of said executable re-entrant or object-oriented code modules, assigning unique module identifier values to said code modules by said stack signing software, said stack signing software preventing module identifiers from having a same value for multiple instances of any re-entered or multiply instantiated code module, and pushing onto said processing stack said stack signatures within stack frames allocated to said code modules.

8. The computer readable medium as set forth in claim 7 further comprising software to perform the steps of:
generating an instance number for each instantiation of a code module; and
pushing onto said processing stack said instance numbers associated with said unique module identifier values.

9. The computer readable medium as set forth in claim 7 further comprising software for performing the step of pushing onto said stack an entry/exit indicator associated with said unique module identifier.

10. The computer readable medium as set forth in claim 7 further comprising software for performing the step of inserting stack signature marking software segments into application source code, said insertion step being performed prior to compilation of said application source code.

11. The computer readable medium as set forth in claim 10 further comprising software for performing the step of providing a global control which indicates all application source code modules are to have stack signature marking software segments inserted into them during a given compilation job.

12. The computer readable medium as set forth in claim 10 further comprising software for performing the step of providing a selective control which indicates only certain application source code modules are to have stack signature marking software segments inserted into them during a given compilation job.

13. A system for inserting stack signature marking code segments into application software modules prior to compilation, said system cooperating with a compiler and comprising:
a control means operable by a user to indicate whether or not to insert stack signature marking code segments into application software modules;
a code insertion means which, responsive to the operation of the control means, searches for entry points and exits points in application software modules and inserts stack signature marking code segments following each entry point and prior to each exit point into said application software modules;
a compiler means for producing one or more executable programs containing one or more executable re-entrant or object oriented programming code modules containing said inserted stack signing software; and
a debugger means configured to, upon execution of said executable re-entrant or object-oriented code modules, assign unique module identifier values to said code modules by said stack signing software, said stack signing software preventing module identifiers from having a same value for multiple instances of any re-entered or multiply instantiated code module, and to push onto said processing stack said stack signatures.

14. The system of claim 13 wherein said control means comprises a global control means for indicating insertion of stack signature marking code segments are to be inserted into all application software modules to be compiled.

15. The system of claim 13 wherein said control means comprises a selective control means for indicating specific applications software modules or groups of application software modules into which stack signature marking code segments are to be inserted.

16. The method as set forth in claim 1 further comprising encrypting at least a portion of said stack signature.

17. The method as set forth in claim 2 further comprising encrypting said instance number in said stack signature.

18. The method as set forth in claim 1 wherein said step of pushing stack signatures onto said processing stack comprises:
generating a pseudo-random identifier for each object instance dynamically created during runtime of a re-entrant executable code module; and
including said pseudo-random identifier in said stack signature pushed onto said processing stack.

* * * * *